(12) United States Patent
Homburg et al.

(10) Patent No.: US 12,006,846 B2
(45) Date of Patent: Jun. 11, 2024

(54) ADDITIVELY MANUFACTURED INTERMEDIATE DUCT FOR DISPOSITION BETWEEN A LOW-PRESSURE COMPRESSOR AND A HIGH-PRESSURE COMPRESSOR, AND CORRESPONDING MANUFACTURING METHOD

(71) Applicant: MTU Aero Engines AG, Munich (DE)

(72) Inventors: Ralf Homburg, Dachau (DE); Harsimar Sahota, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 1053 days.

(21) Appl. No.: 16/759,489

(22) PCT Filed: Oct. 31, 2018

(86) PCT No.: PCT/DE2018/000319
§ 371 (c)(1),
(2) Date: Aug. 12, 2020

(87) PCT Pub. No.: WO2019/086065
PCT Pub. Date: May 9, 2019

(65) Prior Publication Data
US 2023/0203960 A1    Jun. 29, 2023

(30) Foreign Application Priority Data
Nov. 2, 2017 (DE) .......................... 102017010129.9

(51) Int. Cl.
*F01D 1/00* (2006.01)
*F01D 9/06* (2006.01)

(52) U.S. Cl.
CPC .......... *F01D 9/065* (2013.01); *F05D 2230/00* (2013.01)

(58) Field of Classification Search
CPC ......... B33Y 80/00; B33Y 10/00; B33Y 70/00; B33Y 30/00; F23R 3/002; F23R 3/06; F23R 2900/00018; B22C 9/10
(Continued)

(56) References Cited

U.S. PATENT DOCUMENTS 8,944,139 B2 *   2/2015   Jonsson ................. B22F 10/25
                                                                     164/98
2006/0051200 A1   3/2006   Hoeger
(Continued)

FOREIGN PATENT DOCUMENTS

EP         1632648        3/2006
EP         2669474       12/2013
(Continued)

OTHER PUBLICATIONS

See Search Report of PCT/DE2018/000319, dated Feb. 19, 2019.

*Primary Examiner* — Long T Tran
*Assistant Examiner* — James J Kim
(74) *Attorney, Agent, or Firm* — Davidson Kappel LLC (57) ABSTRACT

An intermediate duct (10) for disposition between an outlet of a low-pressure compressor and an inlet of a high-pressure compressor of a turbomachine, in particular of an aircraft engine is provided, the intermediate duct including an outer wall (2) and an inner wall (3) between which are disposed an optional exit stator ring (4) and at least one strut (12) extending radially with respect to a central axis of the intermediate duct (10). The intermediate duct (10) is at least partially manufactured by additive manufacturing. A method for manufacturing such an intermediate duct (10), and a turbomachine having such an intermediate duct (10) are also provided.

19 Claims, 7 Drawing Sheets

(58) Field of Classification Search
USPC .................................................... 415/182.1
See application file for complete search history.

(56) References Cited

U.S. PATENT DOCUMENTS

| | | |
|---|---|---|
| 2011/0008156 A1 | 1/2011 | Prentice et al. |
| 2012/0027603 A1* | 2/2012 | Gindorf ................ F04D 29/023 |
| | | 416/213 R |
| 2012/0243983 A1 | 9/2012 | Breeze-Stringfellow |
| 2013/0330180 A1 | 12/2013 | Guendogdu et al. |
| 2015/0315923 A1* | 11/2015 | Bordoni .................. F01D 9/065 |
| | | 415/175 |
| 2019/0022927 A1 | 1/2019 | Vial et al. |
| 2019/0178098 A1* | 6/2019 | Wunderer ............. F04D 27/023 |
| 2021/0079807 A1* | 3/2021 | Bradbrook .............. F01D 9/045 |

FOREIGN PATENT DOCUMENTS

| | | |
|---|---|---|
| EP | 2995771 A1 | 3/2016 |
| WO | WO2010123413 | 10/2010 |
| WO | WO2013165281 | 11/2013 |
| WO | WO2017118806 | 7/2017 |

* cited by examiner

ADDITIVELY MANUFACTURED INTERMEDIATE DUCT FOR DISPOSITION BETWEEN A LOW-PRESSURE COMPRESSOR AND A HIGH-PRESSURE COMPRESSOR, AND CORRESPONDING MANUFACTURING METHOD

The invention relates to an intermediate duct for disposition between an outlet of a low-pressure compressor and an inlet of a high-pressure compressor, a method for manufacturing such an intermediate duct, and to a turbomachine having such an intermediate duct.

BACKGROUND

In a turbomachine including a low-pressure compressor and a high-pressure compressor arranged downstream thereof, an output of the low-pressure compressor is typically fluidically connected by an intermediate or transition duct to an inlet of the high-pressure compressor. In the case of aircraft engines, for example, such an intermediate or transition duct is also referred to as inter-compressor duct (ICD), and its basic geometry is derived from the requirement of redirecting the flow of a working fluid of the turbomachine during operation from a relatively large radius of the low-pressure compressor through the intermediate duct to a relatively significantly smaller radius of the high-pressure compressor. In this connection, it is desired, on the one hand, to keep aerodynamic losses to a minimum, and, on the other hand, to ensure highest possible uniformity of the fluid flow at the outlet of the intermediate duct. Such an inter-compressor duct (ICD) extends at a relatively steep angle due to the different radii of the low-pressure and high-pressure compressors, and includes, in addition to an outer wall and an inner wall, two functional elements, namely an outlet guide vane (OGV) assembly; i.e., an aerodynamically profiled exit stator ring disposed at the inlet of the intermediate duct, and generally a plurality of struts, also referred to as supporting ribs, which are disposed downstream of the exit stator ring. The struts connect the outer and inner walls together and support them structurally and mechanically.

Current intermediate ducts between a low-pressure compressor and a high-pressure compressor are manufactured as castings and therefore necessarily have a relatively simple shape, which results in limitations to their functionality. In particular, the known intermediate ducts, on the one hand, produce relatively high aerodynamic losses, and, in addition, provide only limited uniformity of the exiting fluid flow, which results in corresponding efficiency losses in the downstream high-pressure compressor.

SUMMARY OF THE INVENTION

It is an object of the present invention to provide an intermediate duct for disposition between a low-pressure compressor and a high-pressure compressor of a turbomachine, which intermediate duct has improved aerodynamics and enhances the efficiency of an associated turbomachine. Further objects of the invention are to provide a method for manufacturing such an intermediate duct, and a turbomachine having such an intermediate duct.

The present invention provides an intermediate duct, a method for manufacturing such an intermediate duct, and a turbomachine having such an intermediate duct. Advantageous embodiments of each inventive aspect are considered to be advantageous embodiments of the respective other inventive aspects.

A first aspect of the invention relates to an intermediate duct for disposition between an outlet of a low-pressure compressor and an inlet of a high-pressure compressor of a turbomachine, in particular of an aircraft engine, the intermediate duct including an outer wall and an inner wall between which are disposed an optional exit stator ring and at least one strut extending radially with respect to a central axis of the intermediate duct. In accordance with the invention, improved aerodynamics are made possible by the fact that the intermediate duct is at least partially manufactured by additive manufacturing. In other words, the invention provides that the intermediate duct be partially or completely manufactured by means of an additive manufacturing (AM) process, for example an additive layer manufacturing process, such as laser sintering or laser melting. Compared to conventional manufacturing processes, such as casting, milling and the like, this allows cost-effective, efficient manufacturing of geometrically complex structures which cannot, or only with great difficulty, be made using conventional processes (precision casting, milling, PECM, and the like). Using additive manufacturing, such a component can be integrally manufactured, and even "exotic" three-dimensional wall and gas path contours from the optimizer could be implemented. Possible examples include warped struts, endwall contours (EWCs) of complex profile, and the like. In addition, it is also possible to optimize the wall thickness of the outer wall and/or of the inner wall and thereby save additional weight in the structural/mechanical design; i.e., in the design of the intermediate duct. The improved aerodynamics make it possible to reduce the overall length of the intermediate duct, which allows for further weight savings. As a result, such an intermediate or transition duct may not only reduce the fuel consumption of an associated turbomachine just by the reduced length (via trade factor), but may also have a reduced weight while providing equal length or even improved guidance of the flow to the high-pressure compressor in the operating range of the turbomachine. This allows a correspondingly higher efficiency of the associated turbomachine. Preferably, the intermediate duct according to the invention includes a plurality of struts, which are preferably uniformly distributed around the circumference of the intermediate duct. Since the strut(s) can be geometrically freely shaped, they not only perform a mechanical supporting function, but optionally may also take over the aerodynamic function of the exit stator ring, so that the exit stator ring may be dispensed with in some embodiments. This allows for additional weight and space savings. In the context of this disclosure, "a" and "an" are generally to be read as indefinite articles and always also as "at least one," unless expressly stated otherwise. Conversely, "a" and "an" may also be understood to mean "only one." It is generally noted that the terms "axial," "radial" and "circumferential" always refer to the machine axis or axis of rotation of the turbomachine, unless the context implicitly or explicitly indicates otherwise.

An advantageous embodiment of the invention provides that the intermediate duct be composed of at least two connected segments. Depending on the required size of the intermediate duct, this facilitates the additive manufacturing process because currently available metal sintering or melting machines provide only a relatively small building space. In addition, the segmented design also facilitates the assembly of the intermediate duct and its installation into the turbomachine. Preferably, the segments are two half-shells.

Another advantageous embodiment of the invention provides that the outer wall and/or the inner wall and/or the exit stator ring and/or the at least one strut include at least one cavity. This makes it possible to achieve corresponding weight savings. The formation of one or more cavities can only be practically accomplished using the additive manufacturing process, which allows a lightweight construction having the same or even higher strength than conventional castings.

Another advantageous embodiment of the invention provides that the at least one cavity be configured as an open cavity or as a closed cavity and/or that at least one cavity be round or oval in cross section and/or that at least two cross sections of the at least one cavity be staggered relative to each other and/or that at least one cavity have at least one constriction and/or that the cavity be supported by at least one supporting strut, in particular by a network of supporting struts. This in particular allows the parameters "weight" and "strength" of the intermediate duct to be optimally adapted to the particular use contemplated.

Further advantages are obtained because the outer wall and/or the inner wall and/or the exit stator ring and/or the at least one strut have a bionic design. Weight plays a crucial role, especially in aviation. At the same time, however, a reduction in weight must not lead to a loss of stability and reliability. Therefore, a bionic design that optimally combines stability and material efficiency is especially beneficial and can be reliably and very economically manufactured, even in small quantities, through additive manufacturing. A bionic design may include, for example, a lattice and/or honeycomb structure. Also conceivable are lattice structures corresponding to or derived from the structure of the spongy tissue in bones. Furthermore, non-uniform material fill-factors, such as fill-factor gradients, may be implemented.

Another advantageous embodiment of the invention provides that the at least one strut include a cavity that forms a channel having an inlet port and an outlet port and allowing an operating fluid to be passed therethrough through the intermediate duct. This allows air, oil, or other operating fluids to be passed through the intermediate duct via the hollow interior of the strut in order, for example, to ensure supply to other components of the associated turbomachine.

Further advantages are obtained when a fill factor of the at least one strut is between 15% and 95%, in particular between 50% and 90%. The fill factor is understood to be the ratio of the volume of solid material to the volume of void space of the strut. A fill factor of 50%, for example, means that half of the strut is composed of a solid build material and half of the strut is hollow, considered in terms of its total volume. Fill factors between 15% and 95% include, for example, fill factors of 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94% or 95%, the respective intermediate values being considered as covered by this disclosure. Preferably, the fill factor is 50% to 90%. This, too, allows the parameters "weight" and "strength" to be optimally adapted to the particular operational requirements.

Another advantageous embodiment of the invention provides that a thickness ratio of the maximum thickness to the axial length of the at least one strut be between 15% and 45%; i.e., for example, 5%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44% or 45%. In this connection, "thickness" is understood to mean the maximum thickness or width in the circumferential direction of the intermediate duct for a cross section at a specific radial height of the strut, while the length refers to the maximum extent of the strut in the axial direction for this cross section. This allows the aerodynamic properties of the at least one strut to be adapted to the particular requirements of the associated turbomachine.

In another advantageous embodiment of the invention, the at least one strut has an out-of-plane curvature in the circumferential direction. Thus, the strut possesses particularly favorable aerodynamic properties and is particularly reliable in preventing unwanted flow separation. The out-of-plane curvature may generally be convex and/or concave.

It has turned out to be advantageous if a radial shape of a trailing edge of the at least one strut between the outer wall and the inner wall has a deviation of no more than ±7° in the circumferential direction, considered with respect to the round angle (360°). In other words, the radial shape of the trailing edge contour of the strut varies by no more than 1°, 2°, 3°, 4°, 5°, 6° or 7° in absolute value in the circumferential direction, as compared to a linear trailing edge (which corresponds to 0° deviation). This makes it possible to realize different out-of-plane curvatures, such as U-shaped or S-shaped curvatures. In this connection, the strut may have a corresponding radial shape not only in the region of its trailing edge, but also in regions located upstream in the axial direction or along its entire axial extent.

It has turned out to be advantageous for the radial shape of the at least one strut to lie at least substantially; i.e., with deviations of no more than ±2°, within a first boundary contour and a second boundary contour, at least in the region of its trailing edge, the first boundary contour being defined by formula (I):

$$y=71.14x^5-179.74x^4+134.76x^3-2.6539x^2-27.72x+5.5815 \qquad (I)$$

and the second boundary contour being defined by formula (II):

$$y=71.14x^5-179.74x^4+134.76x^3-2.6539x^2-27.72x+1.5815 \qquad (II),$$

where x (from 0 to 1) denotes the percentage of the radial height of the strut from the inner wall of the intermediate duct in the region of its trailing edge, and y denotes the deviation, in degrees, in the circumferential direction from a hypothetical linear trailing edge contour having a constant radial shape at 0° (i.e., free of bulges). The shape of the contour may, for example, substantially satisfy formula (III) or formula (IV):

$$y=71.14x^5-179.74x^4+134.76x^3-2.6539x^2-27.72x+3.5815 \qquad (III)$$

or $$y=-323.53x^6+1050.7x^5-1285.1x^4+701.58x^3-129.77x^2-18.216x+3.5061° \qquad (IV),$$

which approximately describe contour values which, for a certain percentage of the radial height of the strut, are less than the first boundary contour, but larger than the second boundary contour. This makes it possible to prevent unwanted flow separations and to optimally direct the flow into the downstream high-pressure compressor.

In a further embodiment, a particularly lightweight yet stable implementation of the intermediate duct is achieved by making it mainly from a titanium alloy, in particular from titanium 6246, or from a nickel-based alloy, in particular IN100.

A second aspect of the invention relates to a method for manufacturing an intermediate duct which is to be disposed between an outlet of a low-pressure compressor and an inlet of a high-pressure compressor of a turbomachine, in particular of an aircraft engine, and which includes an outer wall and an inner wall between which are disposed an optional exit stator ring and at least one strut extending radially with respect to a central axis of the intermediate duct. In accordance with the invention, improved aerodynamics are made possible by manufacturing the intermediate duct at least partially or completely by additive manufacturing. The additive manufacturing process may be, for example, a selective laser sintering and/or melting process. Other features and their advantages can be inferred from the description of the first aspect of the invention.

An advantageous embodiment of the invention provides that the outer wall and/or the inner wall and/or the exit stator ring and/or the at least one strut be manufactured with at least one cavity and/or with a bionic design. This makes it possible to optimize the weight and strength of the intermediate case.

A third aspect of the invention relates to a turbomachine, in particular an aircraft engine, including at least a low-pressure compressor and a high-pressure compressor. The invention allows the efficiency of the turbomachine to be improved by disposing, between an outlet of the low-pressure compressor and an inlet of the high-pressure compressor, an intermediate duct that is designed in accordance with the first aspect of the invention and/or manufactured using a method according to the second aspect of the invention. The resulting features and their advantages can be inferred from the descriptions of the first and second aspects of the invention.

BRIEF DESCRIPTION OF THE DRAWINGS

Other features of the invention will become apparent from the claims, the figures, and the detailed description. The features and feature combinations mentioned above in the description as well as the features and feature combinations mentioned below in the description of the figures and/or shown in isolation in the figures are usable not only in the respectively specified combination, but also in other combinations without departing from the scope of the invention. Thus, embodiments of the invention which are not explicitly shown in the figures or described, but derive from and can be produced by separate feature combinations from the explained embodiments, are also considered to be included and disclosed herein. In addition, embodiments and combinations of features that therefore do not have all of the features of an originally formulated independent claim are also considered to be disclosed herein. Moreover, embodiments and combinations of features that go beyond or differ from the combinations of features set forth in the back-references of the claims should be regarded as having been disclosed, in particular by the embodiments set forth above.

In the drawing.

DETAILED DESCRIPTION

Figure 1:
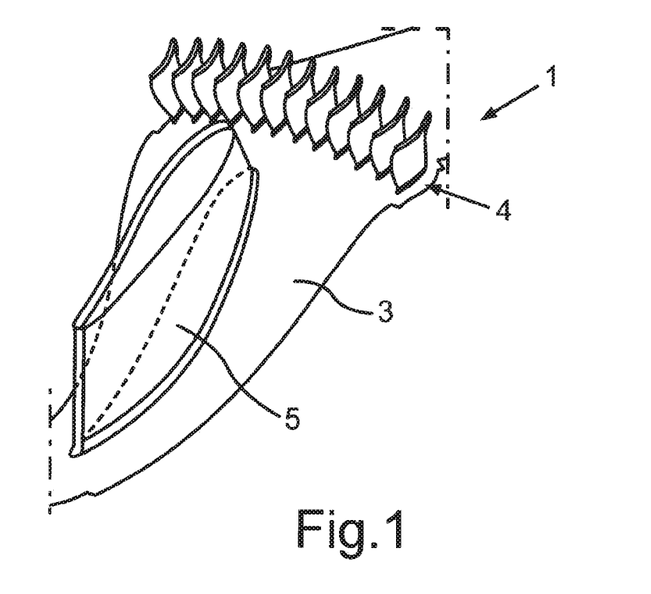
FIG. 1 is a perspective detail view of an intermediate duct known from the prior art.

FIG. 1 shows, in perspective view, a detail of an intermediate duct 1 known from the prior art. The basic geometry of the radially symmetric intermediate duct 1 (inter-compressor duct (ICD)) is derived from the requirement of redirecting the flow through intermediate duct 1 to a significantly smaller radius, while at the same time keeping aerodynamic losses to a minimum and ensuring highest possible uniformity of the flow at the outlet of intermediate duct 1. Intermediate duct 1 (ICD) includes, in addition to an outer wall 2 (see FIG. 4) and an inner wall 3, an aerodynamically profiled exit stator ring 4 (outlet guide vane (OGV) assembly) disposed at the inlet of intermediate duct 1 and having a large number of vanes. The number of vanes is generally at least approximately equal to the number of blades of a last rotor stage of an upstream low-pressure compressor (LPC). Disposed downstream of exit stator ring 4 are a plurality of circumferentially spaced-apart struts 5 (also called supporting ribs), which substantially connect outer wall 2 and inner wall 3 together and support them structurally and mechanically. The ratio of the vanes of exit stator ring 4 to struts 5 may generally be varied between about 8:1 and about 16:1, and may be, for example, 12:1. The manufacture of intermediate duct 1 (ICD) requires the provision of complex components; i.e., an OGV assembly 4 including rings and guide vanes, as well as one (or more) component(s) for each of the outer and inner walls 2, 3 of intermediate duct 1, as well as the individual struts 5 connecting outer and inner walls 2, 3. The components of intermediate duct 1 are formed by precision casting as well as by turning and milling processes and, therefore, have relatively simple geometries, including closed shapes of solid material. Due to the steepness of intermediate duct 1, it is (economically) not or hardly possible to manufacture more complex geometries using conventional casting, turning and milling processes.

Figure 2:
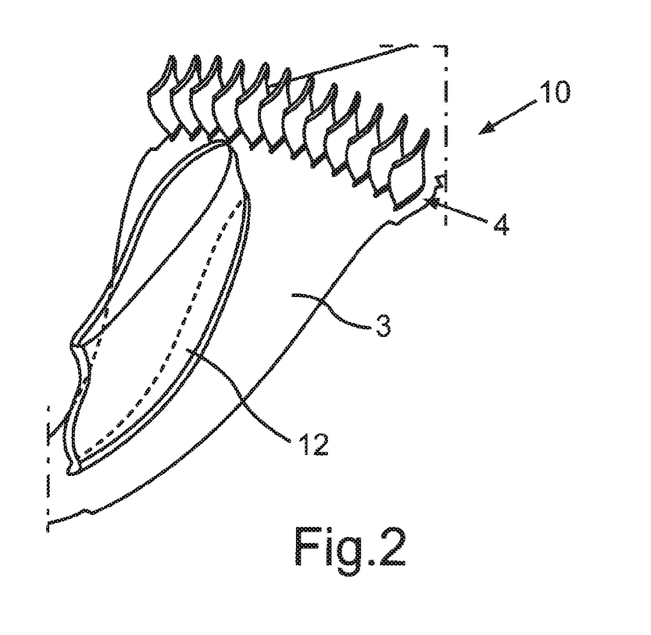
FIG. 2 is a perspective detail view of an intermediate duct according to the invention.

FIG. 2 shows a perspective detail of an inventive intermediate duct 10 that is additively manufactured using a laser melting process. Additive manufacturing of intermediate duct 10 (ICD) avoids the above-mentioned disadvantages and is limited essentially by component size limitations imposed by the production machine used. It can be seen that the exemplarily shown strut 12 has a complex, curved structure ("S-curvature"), which, depending on its configuration, may perform an aerodynamic function to impart a swirl to the flow or to straighten the flow. In some embodiments of intermediate duct 10, it is therefore possible to completely dispense with an exit stator ring 4. This allows a further reduction in the length of intermediate duct 10, thus allowing for further weight and space savings. Since the essential function of intermediate duct 10, in addition to geometrically connecting the low-pressure compressor and the high-pressure compressor, is to redirect the flow with as little loss as possible, the load-bearing capability of the component is limited. Therefore, intermediate duct 10 may be manufactured in the form of a bionic hollow structure.

Figure 3:
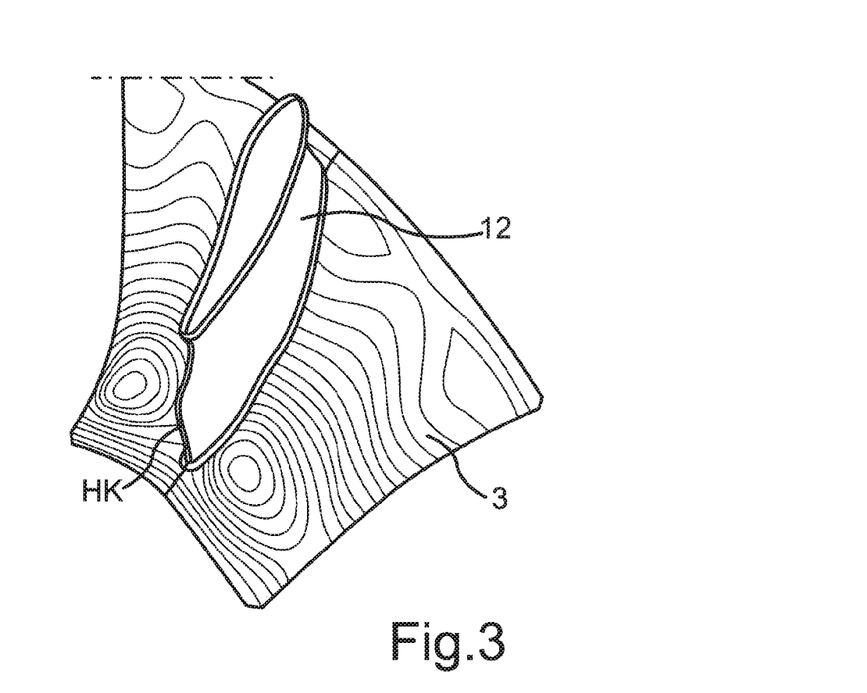
FIG. 3 is a perspective plan view of an inner wall and a strut of the intermediate duct.
Figure 4:
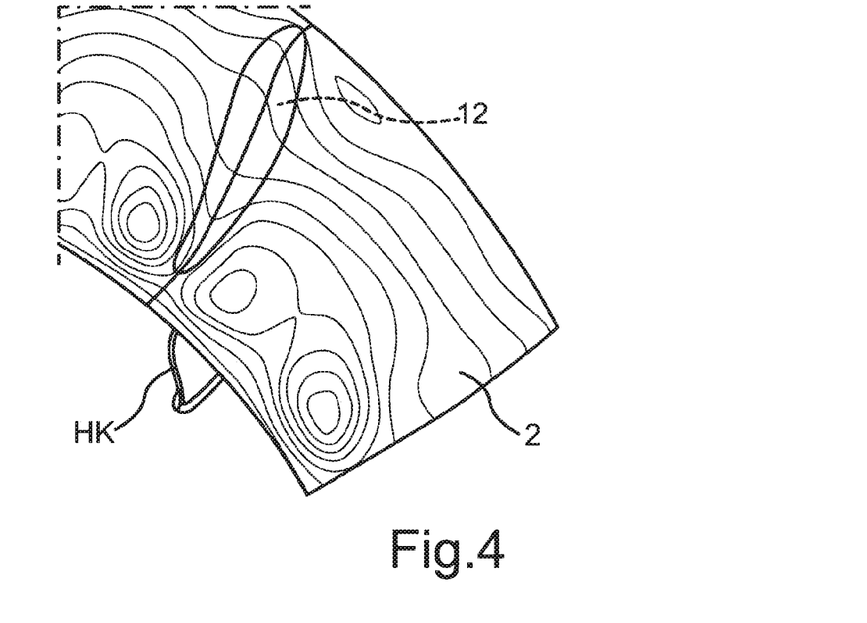
FIG. 4 is a perspective plan view of an outer wall and the strut of the intermediate duct.

FIG. 3 shows a perspective plan view of inner wall 3 and strut 12 of intermediate duct 10, while FIG. 4 shows a perspective plan view of outer wall 2 and strut 12 of intermediate duct 10. It can be seen that, as an alternative or in addition to the complex geometry of the strut 12, complex three-dimensional structures of outer and/or inner walls 2, 3 can also be fabricated when using additive manufacturing. By way of example, relative elevations located downstream are indicated by red elevation contour line areas, while blue elevation contour line areas indicate relative depressions located upstream. In the aft 30% of the chord length of strut 12, the following contouring parameters should be provided (for each strut section) in the design for aerodynamic loss reduction:

Inner wall 3:

Variation of the inner wall radii in the range with a protrusion of up to about 5% into the duct and a maximum height variation near the trailing edge HK; local, weakly varying annular outward relaxation or deformation at the duct inlet.

Outer wall 2:

Variation of the outer wall radii in the range of about 2-3% with two outward contour features, whereas a weakly varying annular constriction is formed at the duct inlet. Other geometries are also conceivable.

Figure 5:
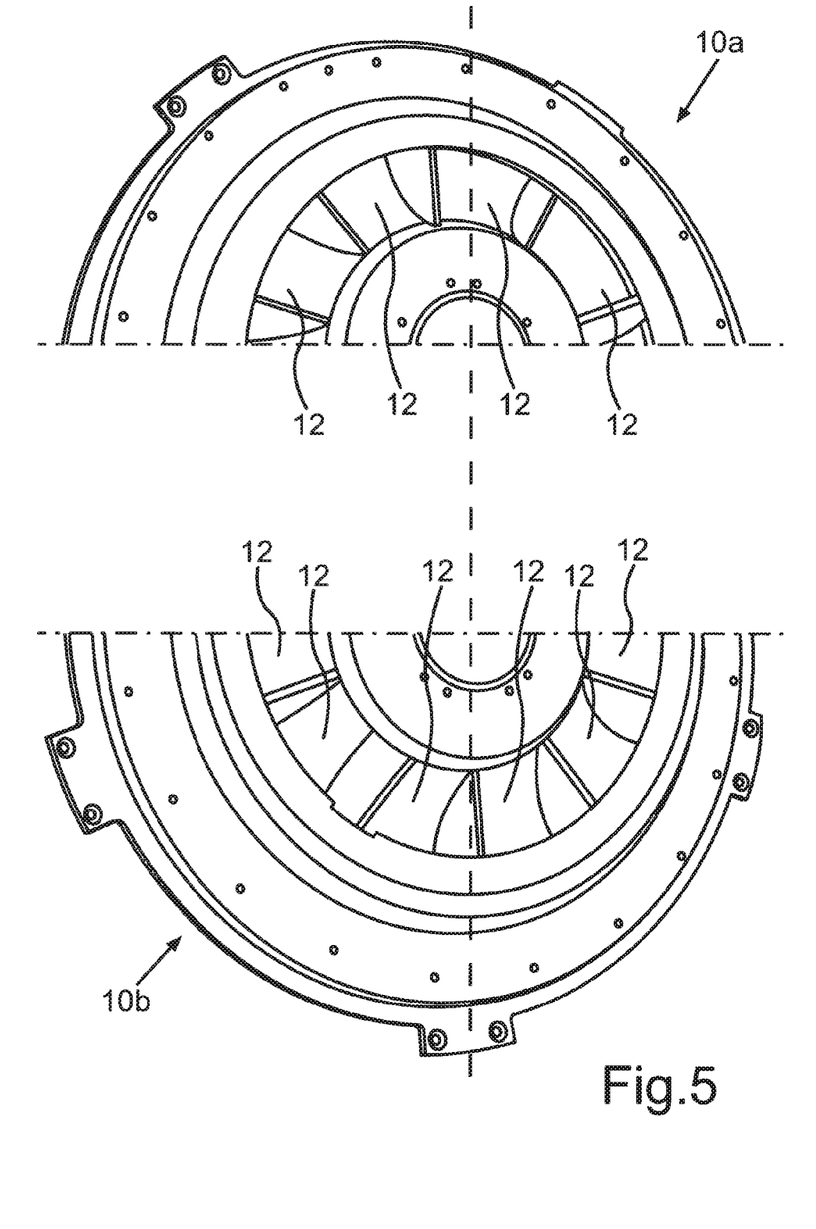
FIG. 5 is a perspective view of two half-shells forming the intermediate duct.

FIG. 5 shows a perspective view of two half-shells 10a, 10b, of which intermediate duct 10 is composed; i.e., from which it is assembled. In this view, there can be seen the circumferentially distributed struts 12 and the flow passages of intermediate duct 10 located therebetween. The rear side (not visible in FIG. 5) is mounted to an outlet of a low-pressure compressor (not shown) of an aircraft engine, while a front side is mounted to an inlet of a high-pressure compressor (not shown).

Figure 6:
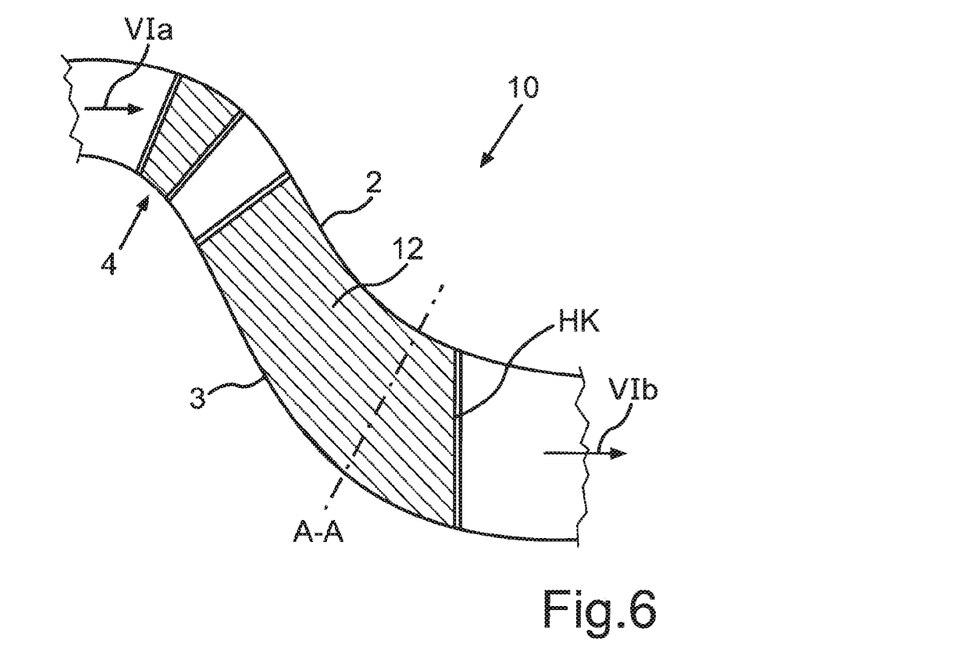
FIG. 6 is a schematic axial sectional view of the intermediate duct.
Figure 7:
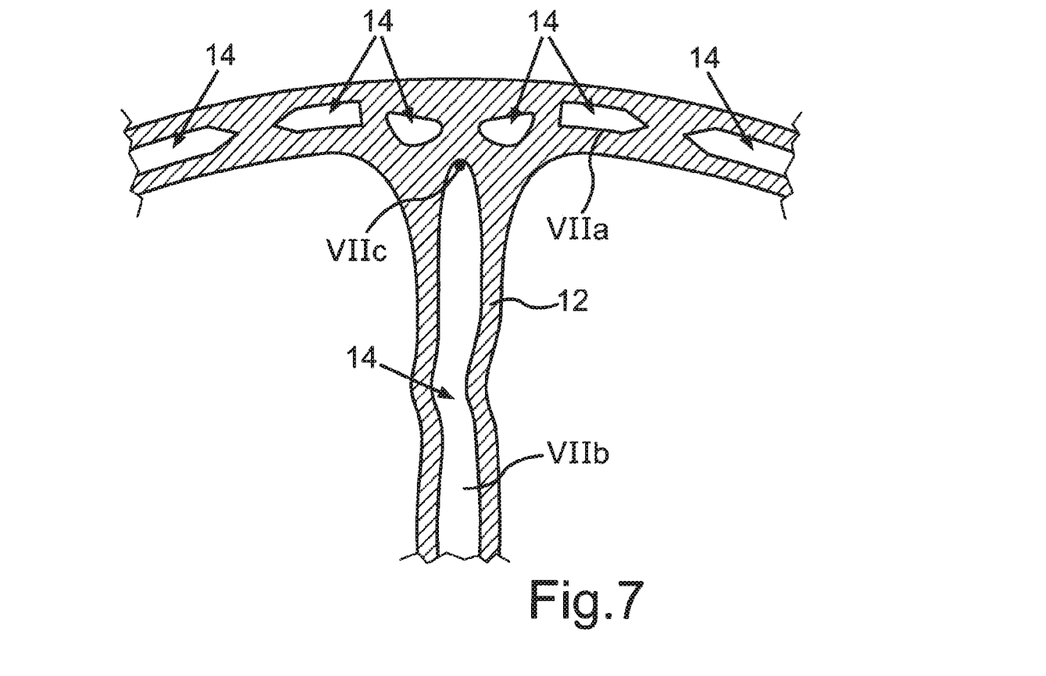
FIG. 7 is a schematic radial sectional view of the intermediate duct in a radial section along line A-A in FIG. 6.
Figure 8:
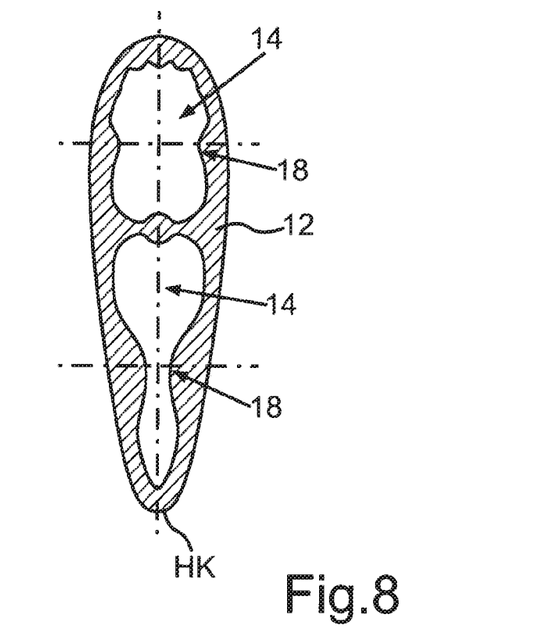
FIG. 8 is a schematic cross section of a strut of the intermediate duct.

FIG. 6 shows a schematic axial sectional view of intermediate duct 10 and is described below in conjunction with FIG. 7 and FIG. 8. FIG. 7 shows a schematic radial sectional view of intermediate duct 10 in a radial section along line A-A in FIG. 6, while FIG. 8 shows a schematic cross section of strut 12 of intermediate duct 10 at about 65% radial depth. It can be seen that the working fluid entering intermediate duct 10 from the low-pressure compressor, as indicated by arrow VIa, passes through optional exit stator ring 4, is redirected radially inwardly, flows past struts 12 and further toward the high-pressure compressor, as indicated by arrow VIb. As can be seen in FIG. 7, outer wall 2 and strut 12 have a bionic design with numerous cavities 14. The same holds true for inner wall 3 (not shown). In region VIIa, the thicknesses of the walls bounding the gas path can be minimized while preserving the hollow structures and in such a way that the gas path loads (impulse, pressure, wall friction) are borne and the material characteristics are optimally utilized. In region VIIb, strut 12 can be optimally designed with a minimal wall thickness and possibly local reinforcements (leading and trailing edges). Furthermore, channels 16 for supply lines (oil lines, etc.) may be provided. In region VIIc, if necessary, axial loads can be dissipated via outer wall 2 directly along rib structure VIIa, or loads can be introduced in a weight-optimized manner from struts 12 via locally reinforced hollow structures in the connection from strut 12 into outer wall 2. In FIG. 8, it can be seen that strut 12 includes two cavities 14, which generally have an oval shape and a constriction 18 approximately in the middle of each. In this embodiment, the fill factor of the at least one strut is about 18%.

Figure 9:
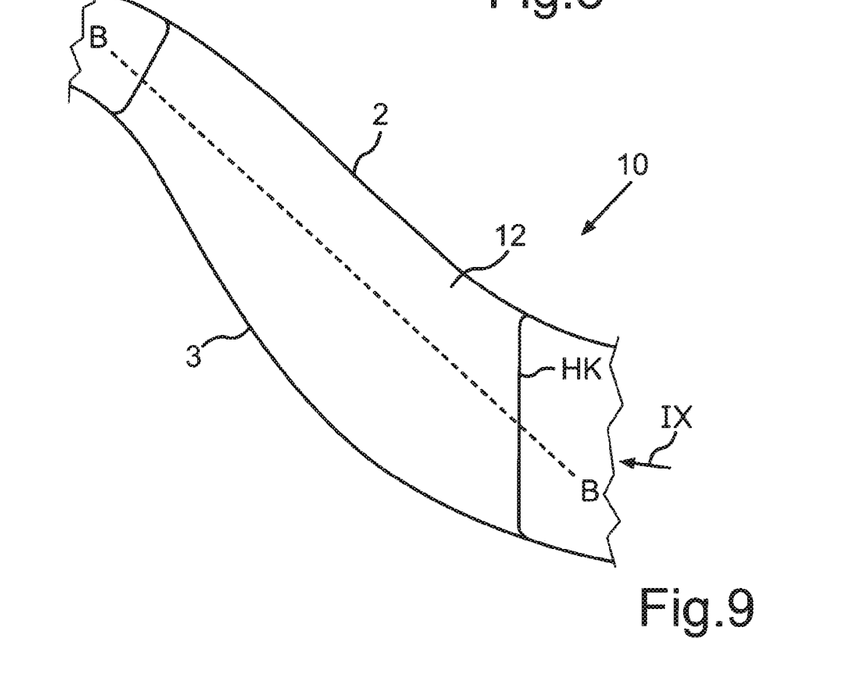
FIG. 9 is a schematic axial sectional view of the intermediate duct according to another exemplary embodiment.

FIG. 9 shows a schematic axial sectional view of intermediate duct 10 according to another exemplary embodiment. It can be seen that, due to the curved, aerodynamically optimized design of strut(s) 12, it is possible to completely dispense with an exit stator ring 4.

Figure 10:
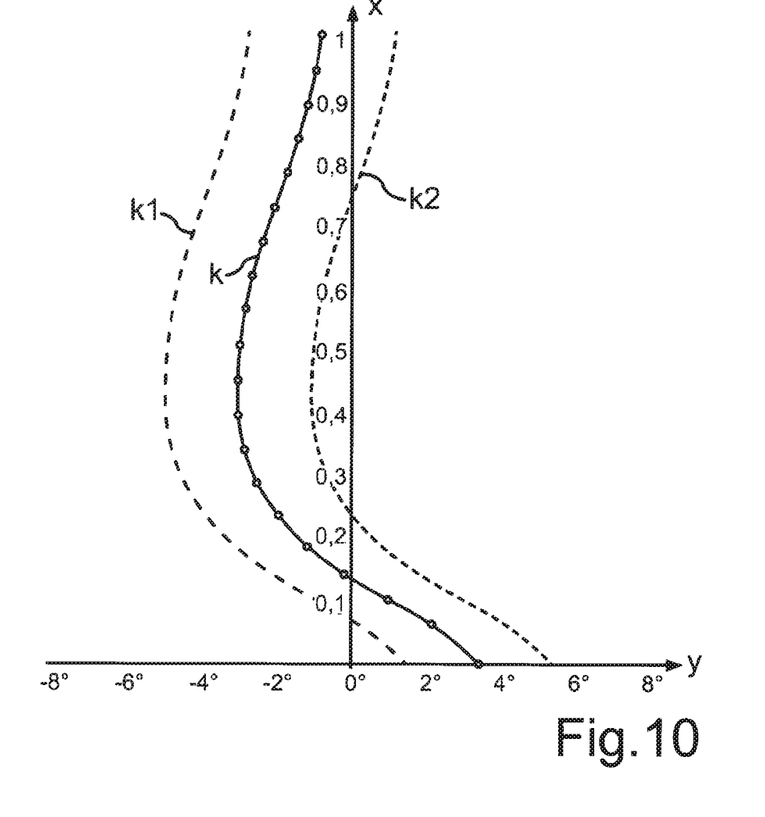
FIG. 10 is a diagram illustrating a radial contour shape in the region of a trailing edge of the strut.

FIG. 10 shows a diagram of the radial contour shape K in the region of a trailing edge HK of the strut 12 depicted in FIG. 9, looking in the direction IX indicated in FIG. 9. The radial extent of strut 12 from inner wall 3 (x=0) to outer wall 2 (x=1) is plotted on the x-axis in steps of 10%, while the deviation in angular degrees from a hypothetical, linear trailing edge (y=0°) is plotted on the y-axis. Also shown are a first boundary contour K1 and a second boundary contour K2, which define a range within which contour K of strut 12 can be freely varied. First boundary contour K1 is approximately defined by formula (I):

$$y = 71.14x^5 - 179.74x^4 + 134.76x^3 - 2.6539x^2 - 27.72x + 5.5815 \quad (I)$$

and the second boundary contour is defined by formula (II):

$$y = 71.14x^5 - 179.74x^4 + 134.76x^3 - 2.6539x^2 - 27.72x + 1.5815 \quad (II),$$

The exemplarily shown contour K is approximately defined by formula (III):

$$y = 71.14x^5 - 179.74x^4 + 134.76x^3 - 2.6539x^2 - 27.72x + 3.5815 \quad (III)$$

Figure 11:
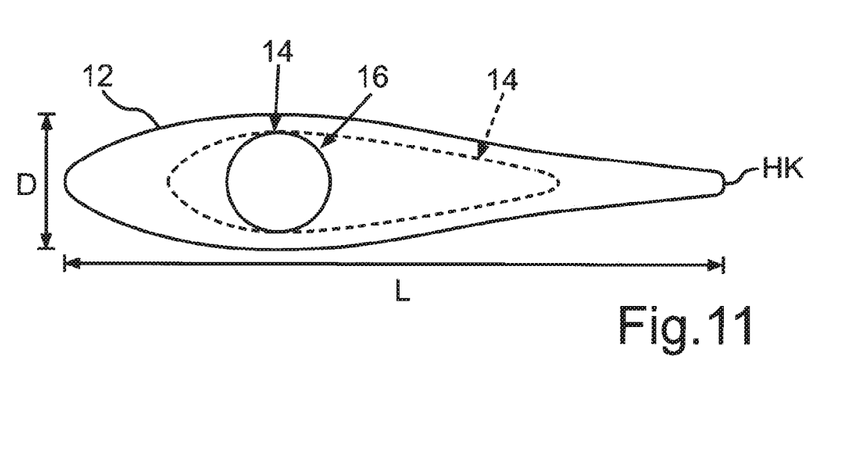
FIG. 11 is a schematic cross section of another exemplary embodiment of the strut.

FIG. 11 shows a schematic cross section of another exemplary embodiment of strut 12 in a section along line B-B in FIG. 9. It can be seen that a fill factor of strut 12 can be varied between 84% (solid-line cavity 14) and 64% (dashed-line cavity 14). Cavity 14 has supporting struts 13 like a human bone. In the present case, thickness ratio D/L can be varied between 17% and 35%. Cavity 14 may be configured in the manner of a through-bore as a channel 16 for passage of oil, air, or other operating fluids therethrough, and may have radially inner and outer ports.

Figure 12:
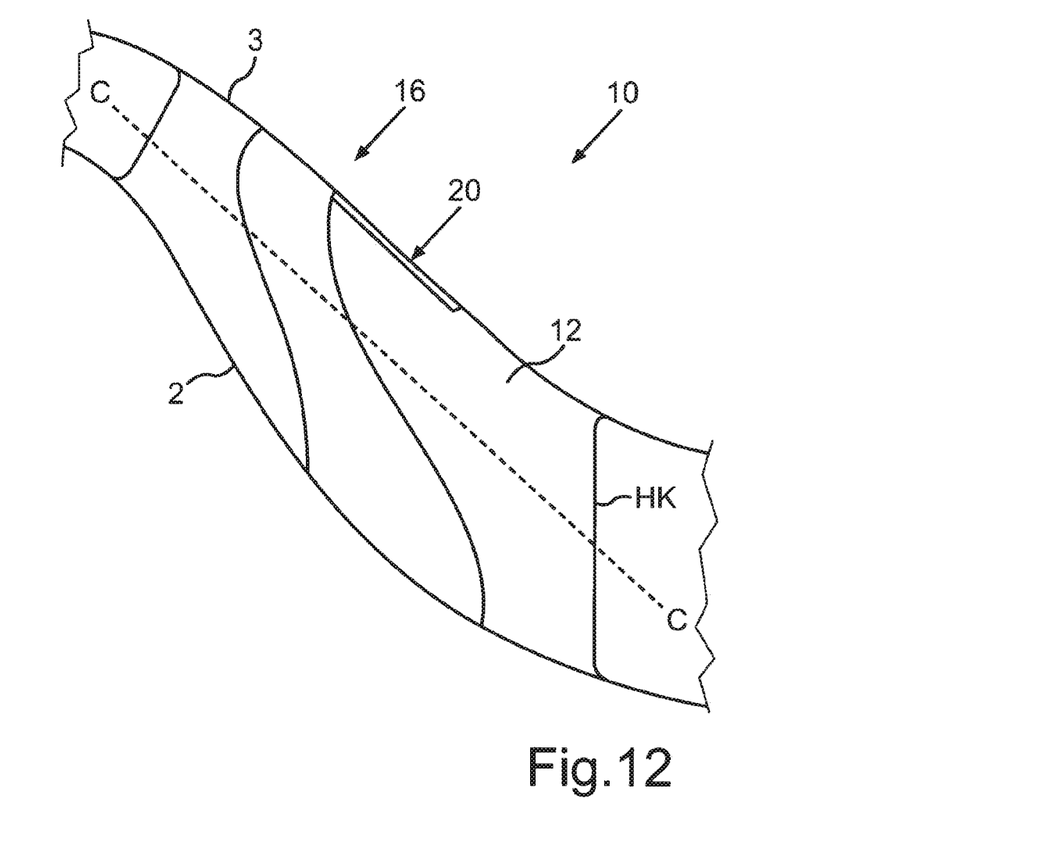
FIG. 12 is a schematic axial sectional view of the intermediate duct according to another exemplary embodiment.
Figure 13:
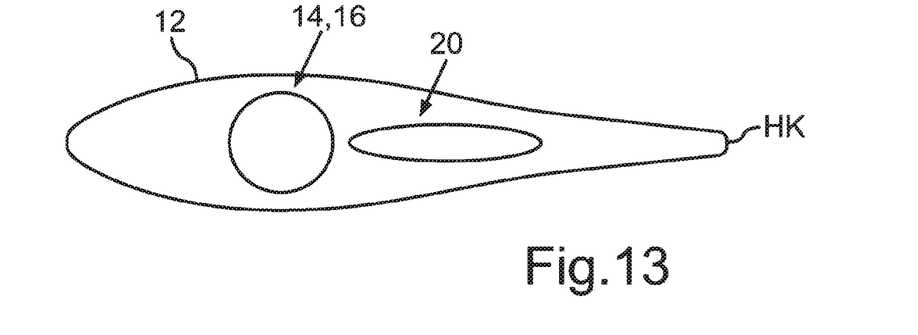
FIG. 13 is a schematic cross section of another exemplary embodiment of the strut.

FIG. 12 shows a schematic axial sectional view of intermediate duct 10 according to another exemplary embodiment; while FIG. 13 shows a schematic cross section of another exemplary embodiment of strut 12 in a section along line C-C in FIG. 12. It can be seen that strut 12 has a cavity 14 configured as a channel 16 extending therethrough. At least two cross sections of channel 16, such as, for example the two cross-sections at the inlet into and at the outlet from strut 12, are staggered relative to each other, so that channel 16 cannot be formed using a drill, for example. In the region of inner wall 3, channel 16 opens into an outlet area 20 for supplying oil, air, or the like, to a hub (not shown) of the turbomachine. In this embodiment, too, thickness ratio D/L is between 17% and 35%.

The parameter values given in the documents for defining process and measurement conditions for characterizing specific properties of the subject matter of the invention are also to be considered as within the scope of the invention, even in the context of deviations, e.g., due to measurement errors, system errors, DIN tolerances, and the like.

LIST OF REFERENCE NUMERALS 1 intermediate duct
2 outer wall
3 inner wall
4 exit stator ring
5 strut
10 intermediate duct
10a half-shell
10b half-shell
12 strut
13 supporting strut
14 cavity
16 channel
18 constrictions
20 outlet area
D thickness
L length
HK trailing edge
K1 first boundary contour
K2 second boundary contour

What is claimed is:

1. An intermediate duct for disposition between an outlet of a low-pressure compressor and an inlet of a high-pressure compressor of a turbomachine, the intermediate duct comprising:
an outer wall;
an inner wall;
at least strut disposed between the outer wall and the inner wall and extending radially with respect to a central axis of the intermediate duct;
the intermediate duct at least partially manufactured by additive manufacturing;
the strut having a surface with a curvature with respect to a plane defined by the radial and axial directions so as to define an out-of-plane curvature in the circumferential direction;
wherein a radial shape of the at least one strut lies within a first boundary contour and a second boundary contour, at least in the region of a trailing edge, the first boundary contour being defined by the formula (I):

$$y = 71.14x^5 - 179.74x^4 + 134.76x^3 - 2.6539x^2 - 27.72x + 5.5815 \quad (I)$$

and the second boundary contour being defined by the formula (II):

$$y = 71.14x^5 - 179.74x^4 + 134.76x^3 - 2.6539x^2 - 27.72x + 1.5815 \quad (II),$$

where x denotes the percentage of the radial height of the strut from the inner wall of the intermediate duct in the region of its trailing edge, and y denotes the deviation, in degrees, in the circumferential direction from a hypothetical linear trailing edge contour having a constant radial shape at 0°.

2. The intermediate duct as recited in claim 1 wherein the intermediate duct is composed of at least two connected segments.

3. The intermediate duct as recited in claim 1 wherein the outer wall or the inner wall or the at least one strut or an exit stator ring disposed between the outer wall and the inner wall include at least one cavity.

4. The intermediate duct as recited in claim 3 wherein the at least one cavity is configured as an open cavity or the at least one cavity is round or oval in cross section or at least two cross sections of the at least one cavity are staggered relative to each other or the at least one cavity has at least one constriction or the cavity is supported by at least one supporting strut.

5. The intermediate duct as recited in claim 3 wherein the at least one cavity is configured a closed cavity or the at least one cavity is round or oval in cross section or at least two cross sections of the at least one cavity are staggered relative to each other or the at least one cavity has at least one constriction or the cavity is supported by at least one supporting strut.

6. The intermediate duct as recited in claim 3 wherein the outer wall or the inner wall or the at least one strut or an exit stator ring disposed between the outer wall and the inner wall include at least one cavity or at least one supporting strut supporting the cavity have a bionic design.

7. The intermediate duct as recited in claim 1 wherein the at least one strut includes a cavity forming a channel having an inlet port and an outlet port and allowing an operating fluid to be passed therethrough through the intermediate duct.

8. The intermediate duct as recited in claim 7 wherein a fill factor of the at least one strut is between 15% and 95%.

9. The intermediate duct as recited in claim 8 wherein the fill factor is between 50% and 90%.

10. The intermediate duct as recited in claim 1 wherein a thickness ratio of a maximum thickness to an axial length of the at least one strut is between 15% and 45%.

11. The intermediate duct as recited in claim 1 wherein a radial shape of a trailing edge of the at least one strut has a deviation of no more than ±7° in the circumferential direction, considered with respect to a round angle.

12. The intermediate duct as recited in claim 1 further comprising an exit stator ring extending radially with respect to a central axis of the intermediate duct.

13. The intermediate duct as recited in claim 1 wherein the intermediate duct is made from a titanium alloy or from a nickel-based alloy.

14. The intermediate duct as recited in claim 13 wherein the intermediate duct is made from titanium 6246 or from IN100.

15. A method for manufacturing the intermediate duct as recited in claim 1 to be disposed between an outlet of a low-pressure compressor and an inlet of a high-pressure compressor of a turbomachine, the intermediate duct including an outer wall and an inner wall between which is disposed an at least one strut extending radially with respect to a central axis of the intermediate duct, the method comprising: manufacturing at least part of the intermediate duct by additive manufacturing.

16. The method as recited in claim 15 wherein the outer wall or the inner wall or the at least one strut or an exit stator ring disposed between the outer wall and the inner wall include at least one cavity or at least one supporting strut supporting the cavity are manufactured with at least one cavity or with a bionic design.

17. A turbomachine comprising:
at least a low-pressure compressor and a high-pressure compressor;
an intermediate duct disposed between an outlet of the low-pressure compressor and an inlet of the high-pressure compressor, the intermediate duct being as recited in claim 1.

18. An aircraft engine comprising the turbomachine as recited in claim 17.

19. The intermediate duct as recited in claim 1 wherein the trailing edge of the strut is curved in the radial direction.

\* \* \* \* \*